United States Patent [19]

Shimada

[11] Patent Number: 5,115,418
[45] Date of Patent: May 19, 1992

[54] SERVO CONTROL APPARATUS

[75] Inventor: Akira Shimada, Tokyo, Japan

[73] Assignee: Seiko Instruments Inc., Japan

[21] Appl. No.: 587,450

[22] Filed: Sep. 25, 1990

[30] Foreign Application Priority Data

Sep. 25, 1989 [JP] Japan ................................ 1-248762
Sep. 25, 1989 [JP] Japan ................................ 1-248763

[51] Int. Cl.⁵ .............................................. G05B 5/01
[52] U.S. Cl. .................................... 318/616; 318/615; 318/568.18
[58] Field of Search ............... 318/615, 616, 617, 618, 318/568.22, 568.24, 568.18

[56] References Cited

U.S. PATENT DOCUMENTS

| | | | |
|---|---|---|---|
| 4,851,754 | 7/1989 | Sakamoto et al. | 318/616 |
| 4,925,312 | 5/1990 | Onaga et al. | 318/568.22 |
| 4,973,174 | 11/1990 | Cosic et al. | 318/618 |
| 5,006,770 | 4/1991 | Sakamoto et al. | 318/616 |

*Primary Examiner*—William M. Shoop, Jr.
*Assistant Examiner*—John W. Cabeca
*Attorney, Agent, or Firm*—Bruce L. Adams; Van C. Wilks

[57] ABSTRACT

A servo control apparatus for controlling according to a position command signal an object in a mechanical drive system having a position detector.

A state observer is receptive of a drive torque signal and a position detection signal from the position detector for processing these signals to estimate concurrently a disturbance torque and velocity of the object to output an estimated disturbance torque signal and an estimated velocity signal.

A position control processor is receptive of the position command signal, the position detection signal, the estimated disturbance signal and the estimated velocity signal for processing these signals to carry out positive feedback of the estimated disturbance torque signal and velocity feedback compensation by the estimated velocity signal to thereby produce the drive torque signal effective to control the object and to cancel out an actual disturbance torque generated in the object.

9 Claims, 5 Drawing Sheets

SERVO CONTROL APPARATUS

BACKGROUND OF THE INVENTION

The present invention relates to a position, velocity or force control apparatus for use in a robot manipulator, machine tool and XY table etc.

Predictable or unpredictable disturbance torque is generated at a motor axis in a mechanical drive system such as a robot or machine tool. The disturbance torque causes disadvantage degradation of controllability such as to hinder normal mechanical drive, induce vibration, and induce tracking error from a target projectory.

Conventionally, as shown in FIG. 2, position and velocity control are performed by a feedback control loop utilizing feedback signals in the form of a position detection signal 6 from a position detector and a velocity signal 14 of a control object 2. In this configuration, the feedback loop operates to automatically eliminate the disturbance torque 7, and the feedback loop is constructed such that the loop gain is set as great as possible to eliminate deviation.

FIG. 5 is a diagram showing a transfer function block corresponding to the FIG. 2 conventional structure. As shown in this block diagram, an integral compensation block 11 is added in the feedback loop to eliminate standing deviation or difference between a position command signal 5 and a detected position represented by the position detection signal 6. However, the stable operating zone of the control system is limited depending on the characteristics of a control object 2. Therefore, simply raising the loop gains $K_1$, $K_2$ and $K_3$ cannot ensure sufficient performance.

There have been proposed various types of the conventional control systems constructed which take into account dynamic characteristic change for predictable disturbance torque. However, these control systems cannot maintain the same control characteristic for adequately controlling unpredictable disturbance torque.

In view of this, as shown in FIG. 3, there has been proposed a conventional velocity control system which utilizes a disturbance torque observer 4 operative to estimate a disturbance torque 7 based on a drive current or a drive torque signal 8 generated in an actuator and a movement velocity signal 14 so that the disturbance torque 7 is treated as part of a control object 2. As shown is FIGS. 2 and 3, a velocity feedback loop is incorporated in a position control processor 3 to construct a position control system so as to improve the controllability.

Because of the desired reduction in size and weight, compact type robots and machine tools are generally not provided with a velocity detector such as a tachometer, but only have a position detector. In such a case, a velocity signal 14 is not directly obtained from the control object, but a differential value of successive position detection data is used as a velocity detection data as shown by the dashed line 14a appearing in FIG. 3. The differential operation by an analog differentiation circuit may not be practical because the analog circuit is susceptive of high frequency noise. Alternatively, the control object is monitored by a position detector which generates pulses indicative of the object position. In such a case, a velocity detection circuit is generally used to produce a voltage proportional to a frequency of the pulses. However, such a velocity detection circuit produces a ripple in a relatively low velocity range, thereby causing degradation of detection accuracy and causing vibration. A low-pass filter may be inserted to remove a ripple of the velocity detection circuit. However the low-pass filter causes a response delay to thereby degrade the controllability. Further, in a digital servo control system, velocity data is approximated by a step difference between the current position data at one sampling time and the preceding position data at an immediately previous sampling time. However, a ripple may also develops in a relatively low velocity range to cause vibration and noise.

As noted above, in the conventional position control system having only a position detector, there are practical problems, in that the observer operates to estimate a disturbance torque based on a drive torque signal and a velocity signal in the form of a differential value of the position detection data.

SUMMARY OF THE INVENTION

An object of the present invention is to therefore utilize an improved observer operative to estimate concurrently a movement velocity of a control object such as a robot arm, a drive shaft of machine tool or a work table, and a disturbance torque generated in the control object due to electrostatical friction, or elastic, viscus or loading variation, based on both a drive torque generated by an actuator and current position data the control object, so as to improve the controllability of servo system.

According to the present invention, the servo control apparatus comprises an observer or state estimating device for processing both a position detection signal of a control object and a drive torque signal to estimate or calculate concurrently a disturbance torque and movement velocity of the object. The estimated disturbance torque undergoes positive feedback and the estimated velocity is used for the velocity feedback compensation so as to carry out servo control. Therefore, the control object is provided only with a position detector, but not provided with a velocity detector.

Further, the servo control apparatus includes a position control processor operative to compare a position command signal and the position detection signal of the control object with each other to thereby carry out the calculation needed for servo control based on the compared results and the estimated velocity data to output a drive torque command signal. Moreover, the drive torque command signal outputted from the position control processor is added with the estimated disturbance torque signal from the observer to produce a drive torque effective to cancel out an actual disturbance load applied to the control object. Consequently, the control object is effectively driven by the net drive torque.

DETAILED DESCRIPTION OF PREFERRED EMBODIMENTS

Figure 1A:
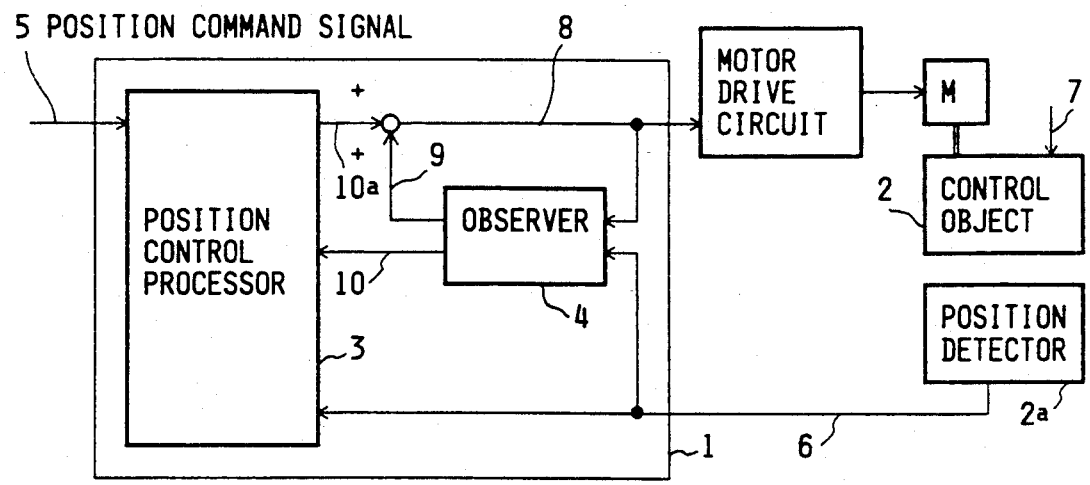
FIG. 1A is a block diagram of a first embodiment of the inventive control apparatus utilizing a disturbance torque and velocity observer.

FIG. 1A shows a first embodiment of the invention in which a control object 2 is of a rotational system. The system is comprised of a servo control device 1 including a position control processor 3 which receives a position command signal 5 and a position detection signal 6 fed from a position detector 2a coupled to the control object 2. The servo control device 1 further contains a disturbance torque and velocity observer 4 which receives the position detection signal 6 and a drive torque signal 8 or drive force signal which is to be fed to a motor drive circuit to drive a motor M to actuate the control object 2. The observer 4 processes both of the signals 6 and 8 to output an estimated disturbance torque signal 9 and an estimated velocity signal 10. The estimated velocity signal 10 is inputted into the position control processor 3 and the estimated disturbance torque signal 9 is added to an output signal 10a, i.e., drive torque command signal of the position control processor 3 to produce the drive torque signal 8.

The position control processor 3 operates to compare the position command signal 5 and the position detection signal 6 with each other to calculate a drive force effective to move the object 2 to a target position determined by the position command signal 5, based on the compared results and the inputted estimated velocity signal 10, to thereby output the drive torque command signal 10a. As described before, the drive torque command signal 10a is added with the estimated disturbance torque signal 9 to produce the drive torque signal 8 effective to cancel out an actual disturbance load 7 generated in the object 2. Namely, the control object 2 is controllably driven by a net drive torque which is the difference between the applied drive torque determined by the drive torque signal 8 and the actual disturbance load 7 generated due to acceleration variation of the object and friction etc. The servo control device 1 operates the internal position control processor 3 and the disturbance and velocity observer 4 through a given software or program by means of a CPU to carry out the needed processing. However, the position control processor 3 and the observer 4 may individually carry out processing and outputting.

Figure 1B:
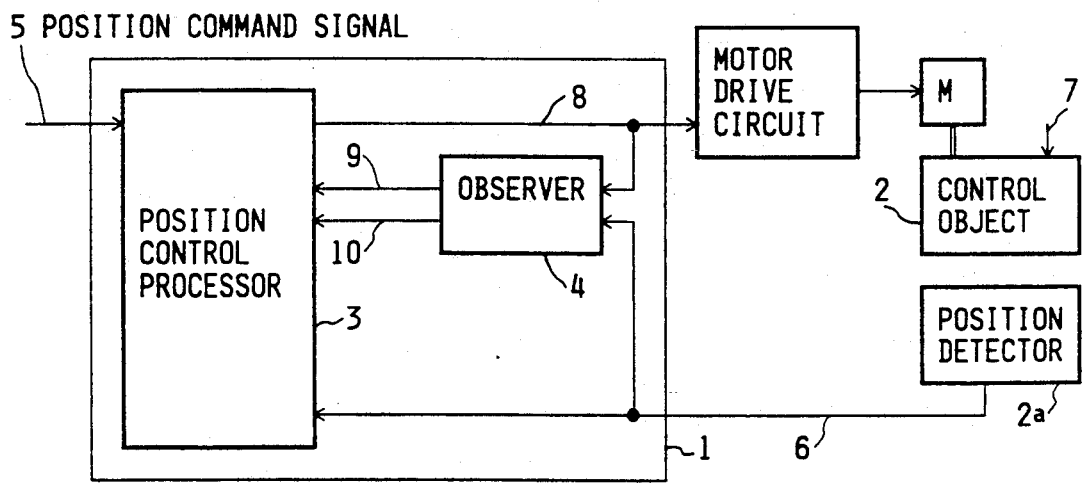
FIG. 1B is a block diagram showing a second embodiment of the inventive control apparatus.
Figure 2:
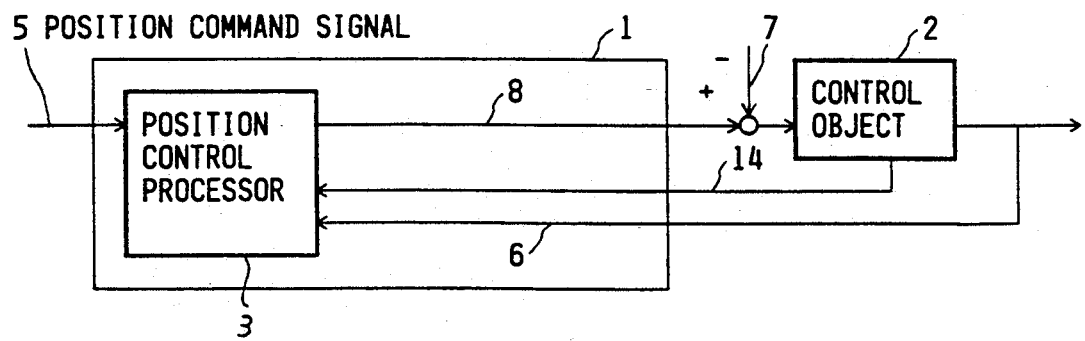
FIG. 2 is a schematic block diagram showing one type of the conventional control apparatus.
Figure 3:
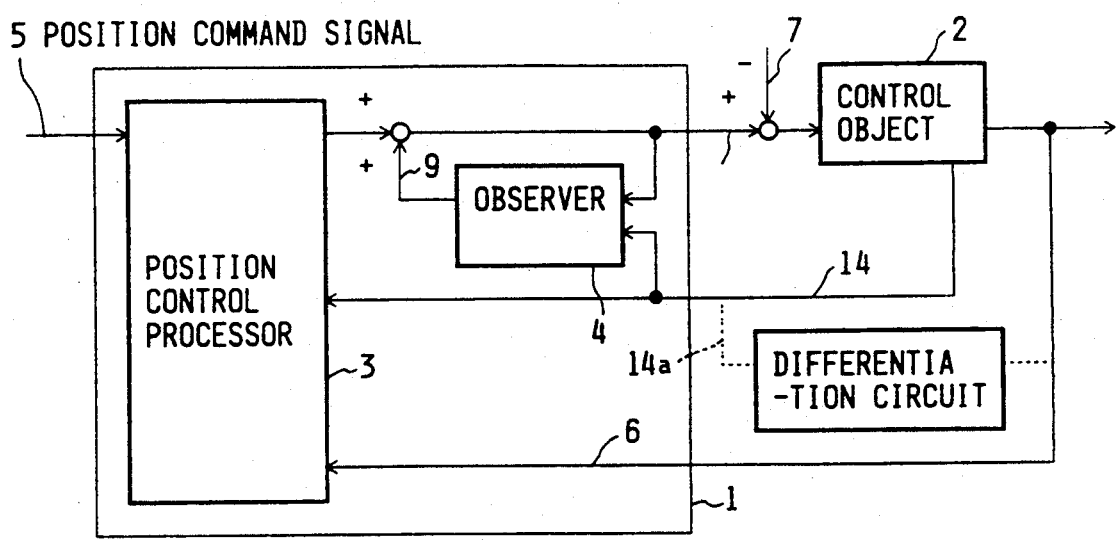
FIG. 3 is a schematic block diagram showing another type of the conventional control apparatus.

FIG. 1B shows a second embodiment of the invention, which is a modification of the FIG. 1A embodiment.

The observed disturbance torque signal 9 is inputted into the position control processor 3. The processor 3 carries out a positive feedback operation of the inputted observed disturbance torque signal 9 to directly produce the drive torque signal 8 effective to cancel out an actual disturbance load 7.

The next description is given for arithmetic operation of the observer for estimating disturbance torque and velocity according to the following equations:

motion equation: $Tm = J\ddot{\theta} + TL$ (1)

state equation: $\dot{X} = AX + BU$ (2)
$Y = CX$ (3)

definition: $X_1 = \theta \backslash u = Tm$ (4)
$X_2 = \dot{\theta} \backslash y = x_1 = \theta$
$X_3 = TL$ assumption: $\frac{d}{dt} TL = 0$ (5)

$$\begin{vmatrix} \dot{x}_1 \\ \dot{x}_2 \\ \dot{x}_3 \end{vmatrix} = \begin{vmatrix} 0 & 1 & 0 \\ 0 & 0 & -1/J \\ 0 & 0 & 0 \end{vmatrix} \begin{vmatrix} x_1 \\ x_2 \\ x_3 \end{vmatrix} + \begin{vmatrix} 0 \\ 1/J \\ 0 \end{vmatrix} u \quad (6)$$

$$y = (1\,0\,0) \begin{vmatrix} x_1 \\ x_2 \\ x_3 \end{vmatrix} \quad (7)$$

The first relation (1) is an equation of motion with respect to the control object where Tm denotes a motor generating torque, J denotes a nominal inertia moment of the object, $\theta$ denotes an angular position of the object, TL denotes a disturbance torque, and a dot "." denotes a time differential operation. The object is represented by the general state equations (2) and (3) in order to obtain an observation of disturbance torque and velocity. The general state equations (2) and (3) are expressed in the form of specific state equations (6) and (7), respectively, by using the motion equation (1) and based on the definition (4) and assumption (5). With regard to the assumption (5), it is recognized that an obtained observation can follow a change of the disturbance torque to a certain degree.

The minimal order observer is applied to the state equations (6) and (7) according to the Gopinath's method which is a basic design method of modern control theory to obtain the following equations (10) and (11) expressed along the following general forms (8) and (9), where the respective state variables are defined according to the following equation (12):

$$\dot{\bar{Z}} = \bar{A}Z + \bar{B}\bar{U} \quad (8)$$
$$\hat{X} = \bar{C}Z + \bar{D}\bar{U} \quad (9)$$

$$\begin{bmatrix} \dot{z}_1 \\ \dot{z}_2 \end{bmatrix} = \begin{bmatrix} -L_1 & -1/J \\ -L_2 & 0 \end{bmatrix} \begin{bmatrix} z_1 \\ z_2 \end{bmatrix} + \begin{bmatrix} -L_1{}^2 - L_2/J & 1/J \\ -L_1 L_2 & 0 \end{bmatrix} \begin{bmatrix} y \\ u \end{bmatrix} \quad (10)$$

$$\begin{bmatrix} \hat{x}_1 \\ \hat{x}_2 \\ \hat{x}_3 \end{bmatrix} = \begin{bmatrix} 0 & 0 \\ 1 & 0 \\ 0 & 1 \end{bmatrix} \begin{bmatrix} z_1 \\ z_2 \end{bmatrix} + \begin{bmatrix} 1 & 0 \\ L_1 & 0 \\ L_2 & 0 \end{bmatrix} \begin{bmatrix} y \\ u \end{bmatrix} \quad (11)$$

$$\hat{x}_1 = y = \theta \quad \hat{\dot{\theta}} = \hat{x}_2 \quad \hat{T}_L = \hat{x}_3 \quad (12)$$

Where $L_1$ and $L_2$ in the equations (10) and (11) denote parameter constants effective to determine eigen values of the system and set to ensure the stability of the system.

Then, digitization is carried out for the disturbance torque and velocity observation obtained by the equations (10) and (11) to realize the observation by a software or computer program of the control device. Namely, a conversion defined by the following equation (13) is carried out to obtain the following equations (16) and (17) expressed along the following general formulas (14) and (15):

$$A = e^{\tilde{A}T} \quad B = \int_0^T e^{\tilde{A}T} dz \cdot \tilde{B} \quad (13)$$

$$Z\{(k+1)T\} = A \cdot Z(kT) + B \cdot U(kT) \quad (14)$$
$$X(kT) = \tilde{C} \cdot Z(kT) + \tilde{D} \cdot U(kT) \quad (15)$$

$$\begin{bmatrix} z_{k11} \\ z_{k21} \end{bmatrix} + \begin{bmatrix} \alpha_{11} & \alpha_{12} \\ \alpha_{21} & \alpha_{22} \end{bmatrix} \begin{bmatrix} z_{k1} \\ z_{k2} \end{bmatrix} + \begin{bmatrix} \beta_{11} & \beta_{12} \\ \beta_{21} & \beta_{22} \end{bmatrix} \begin{bmatrix} y_k \\ u_k \end{bmatrix} \quad (16)$$

$$\begin{bmatrix} \theta_k \\ \dot{\theta}_k \\ T_{Lk} \end{bmatrix} = \begin{bmatrix} x_{k1} \\ x_{k2} \\ x_{k3} \end{bmatrix} = \begin{bmatrix} 0 \\ z_{k1} \\ z_{k2} \end{bmatrix} + \begin{bmatrix} y_k \\ L_1 y_k \\ L_2 y_k \end{bmatrix} \quad (17)$$

Where $Zk_{11}$ indicates $Z_1\{(k+1)T\}$, $Zk_{21}$ indicates $Z_2\{(k+1)T\}$, $Zk_1$ indicates $Z_1(KT)$, $Zk_2$ (KT), yk represents y(kT), uk represents u(kT), $Xk_1$ represents $X_1(KT)$, $Xk_2$ represents $X_2(KT)$, $XK_3$ represents $X_3(KT)$, $\theta k$ represents $\theta(KT)$, $\dot{\theta}k$ represents $\dot{\theta}(KT)$ and $T_{LK}$ represents $T_L(KT)$.

In the above listed equations, respective parameters are represented by the following equations (18)-(27):

$$\alpha_{11} = \frac{\alpha e^{-\alpha T} - \beta e^{-\beta T}}{\alpha - \beta} \quad (18)$$

$$\alpha_{12} = \frac{-e^{-\alpha T} + e^{-\beta T}}{J(\alpha - \beta)} \quad (19)$$

$$\alpha_{21} = \frac{-L_2(e^{-\alpha T} - e^{-\beta T})}{\alpha - \beta} \quad (20)$$

$$\alpha_{22} = \frac{(\alpha + L_1)e^{-\alpha T} - (\beta + L_1)e^{-\beta T}}{\alpha - \beta} \quad (21)$$

$$\beta_{11} = \frac{L_1^2 + L_2/J}{\alpha + \beta}(e^{-\alpha T} - e^{-\beta T}) - \quad (22)$$

$$\frac{L_1 L_2}{J(\alpha - \beta)}\left(\frac{e^{-\alpha T}}{\alpha} - \frac{e^{-\beta T}}{\beta}\right)$$

$$\beta_{12} = \frac{-e^{-\alpha T} + e^{-\beta T}}{J(\alpha - \beta)} \quad (23)$$

$$\beta_{21} = \frac{L_1^2 L_2 + L_2^2/J}{\alpha - \beta}\left(\frac{e^{-\alpha T}}{\alpha} - \frac{e^{-\beta T}}{\beta}\right) + \quad (24)$$

$$\frac{L_1 L_2}{(\alpha - \beta)}\left\{\frac{(\alpha + L_1)e^{-\alpha T}}{\alpha} - \frac{(\beta + L_1)e^{-\beta T}}{\beta}\right\} \quad (25)$$

$$\beta_{22} = \frac{L_2}{J(\alpha - \beta)}\left(\frac{e^{-\alpha T}}{\alpha} - \frac{e^{-\beta T}}{\beta}\right) \quad (26)$$

$$\text{Where } \alpha, \beta = \frac{-L_1 \pm \sqrt{L_1^2 + 4 \cdot L_2/J}}{2} \quad (27)$$

and T denotes a sampling time and J denotes the nominal inertia moment.

Figure 6:
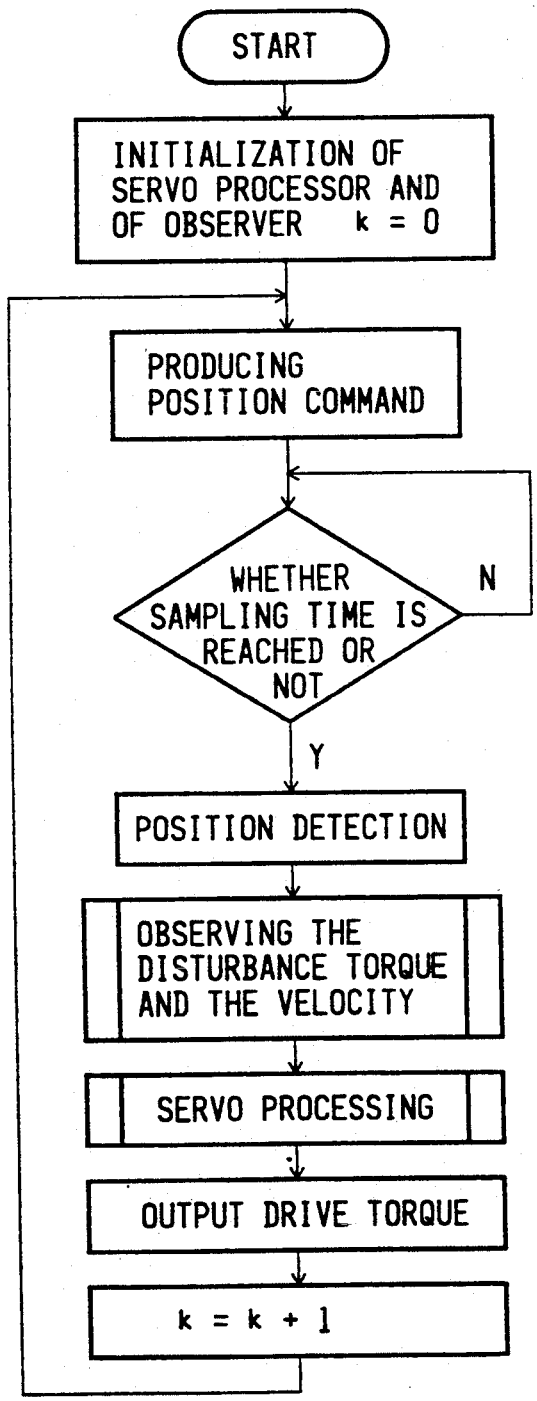
FIG. 6 is a flow chart showing an overall control sequence of the FIG. 1A embodiment.

FIG. 6 is a flow chart which shows how to operate the disturbance torque and velocity observer of the digitized form represented by the equations (16) and (17) within the servo control device. In the flow chart, the above described disturbance and velocity observer is simply denoted as "observer". The servo control device initializes various data and thereafter proceeds to a repetitive loop to produce sequential position command data. Then position r detection is carried out after the lapse of a sampling time. The observer operates to estimate a current disturbance torque and a velocity based on the current position detection data and a preceding data of the inputted drive torque to thereby transfer the observed results to a servo calculation routine. The servo processor outputs a drive torque signal based on the servo processing and updates a cycle number K of the repetitive operation.

Figure 7:
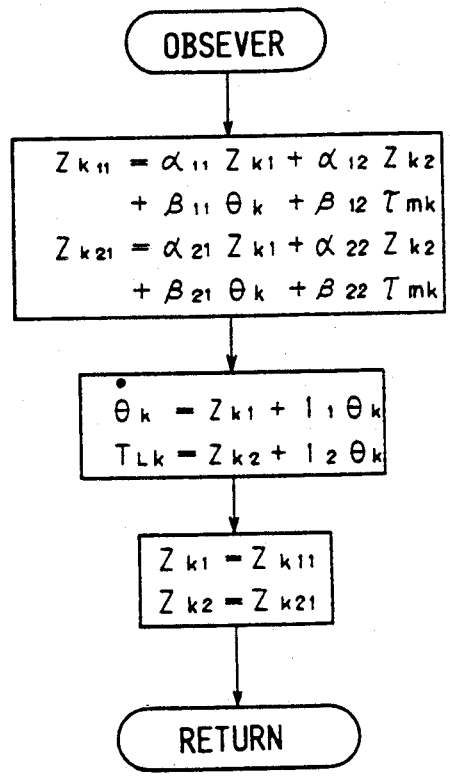
FIG. 7 is a flow chart showing an observation routine in the FIG. 6 control sequence.

FIG. 7 is a flow chart showing a detailed process routine of the observer. Zki (i=0,1,2, . . . ) indicates an intermediate variable within the disturbance torque and velocity observer. The data value of Zki is initially set to zero and then is updated each sampling time within the loop of the FIG. 7 flow chart. Zii1 corresponds to Z $\{(k+1)\}$ of the equation (14) and is a succeeding variable by one sampling timing to Zii which corresponds to Z(K). This variable is sequentially updated through the routine.

Figure 8:
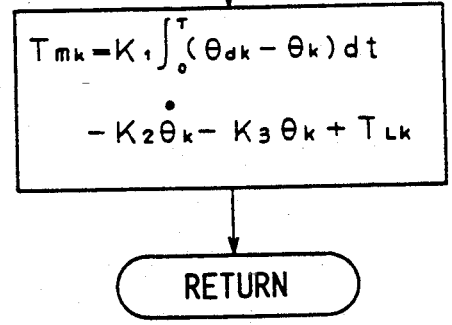
FIG. 8 is a flow chart showing a servo routine in the FIG. 6 control sequence.

FIG. 8 is a flow chart showing the servo routine. The servo routine is carried out to realize control of position and compensation for the disturbance load using the estimated or observed disturbance torque and velocity according to the following equation:

$$Tm_k = K_1 \int_0^T (\theta_{dk} - \theta_k)dt - K_2 \dot{\theta}_k - K_3 \theta_K + T_{LK} \quad (28)$$

Figure 4:
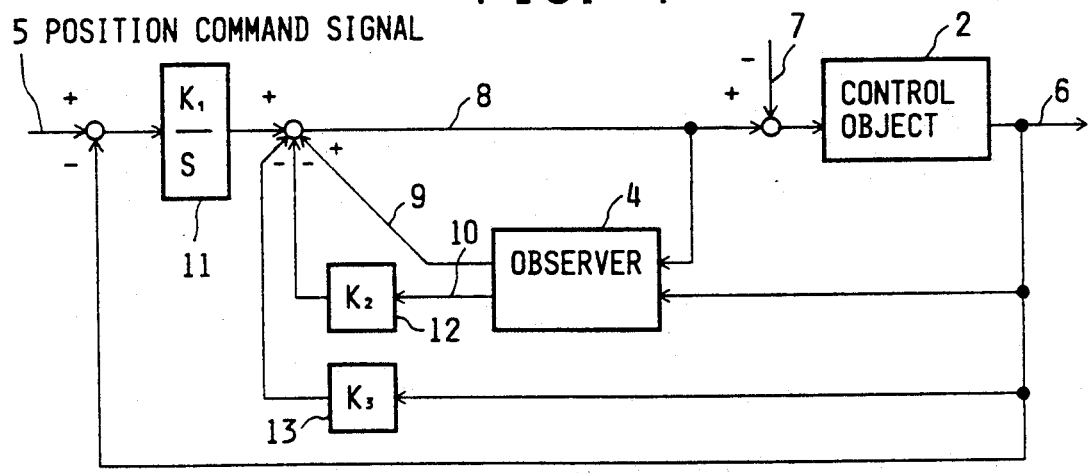
FIG. 4 is a block diagram showing a transfer function of the FIG. 1A embodiment.
Figure 5:
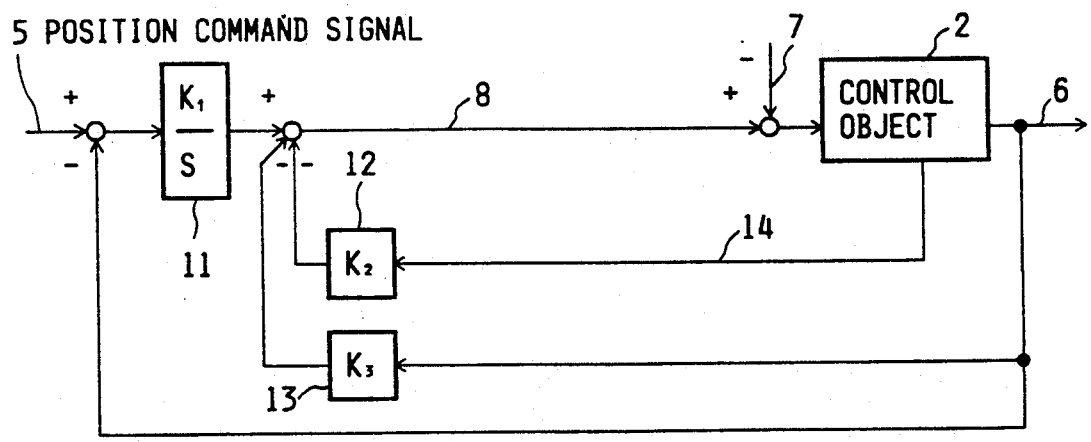
FIG. 5 is a block diagram showing a transfer function of the FIG. 2 prior art.

Where
$\dot{\theta}_k$: estimated velocity
$T_{LK}$: estimated disturbance torque
$T_{mk}$=drive torque
difference between the commanded position $\theta_k$ and the detected position $\theta_{dk}$ is integrated and multiplied by a gain $K_1$. The estimated velocity is multiplied by a gain $-K_2$ and the detected position is multiplied by a gain $-K_3$ to thereby negatively feed back these values. On the other hand the estimated disturbance torque is fed back positively. Consequently, a transfer function block is realized as shown is FIG. 4.

For example, when a robot grips an object having an unknown weight, there is caused an unknown change in the dynamic characteristic parameters of the robot. Further, parameters such as elasticity, viscosity and friction vary according to ambient temperature and humidity in the mechanical drive system of, for example, a robot. The torque variation generated during driving due to these factors may act as a disturbance torque to the control system. The inventive control device is constructed to cancel out the disturbance torque so as to maintain a constant and stable control performance of the control system.

Generally, a velocity ripple is, caused in the position and velocity control system due to the detection of noise and drive torque ripple etc. as well as disturbance torque. In addition to cancelling out the disturbance torque, the disturbance torque in accordance with the present invention, and velocity observer has a low-pas filter characteristic which may be utilized to remove noise generated during the velocity detection through velocity feedback of the estimated velocity. Removal of the disturbance torque and the feedback of estimated velocity are concurrently carried out to realize stable control in low velocity range to suppress velocity ripple.

Figure 9:
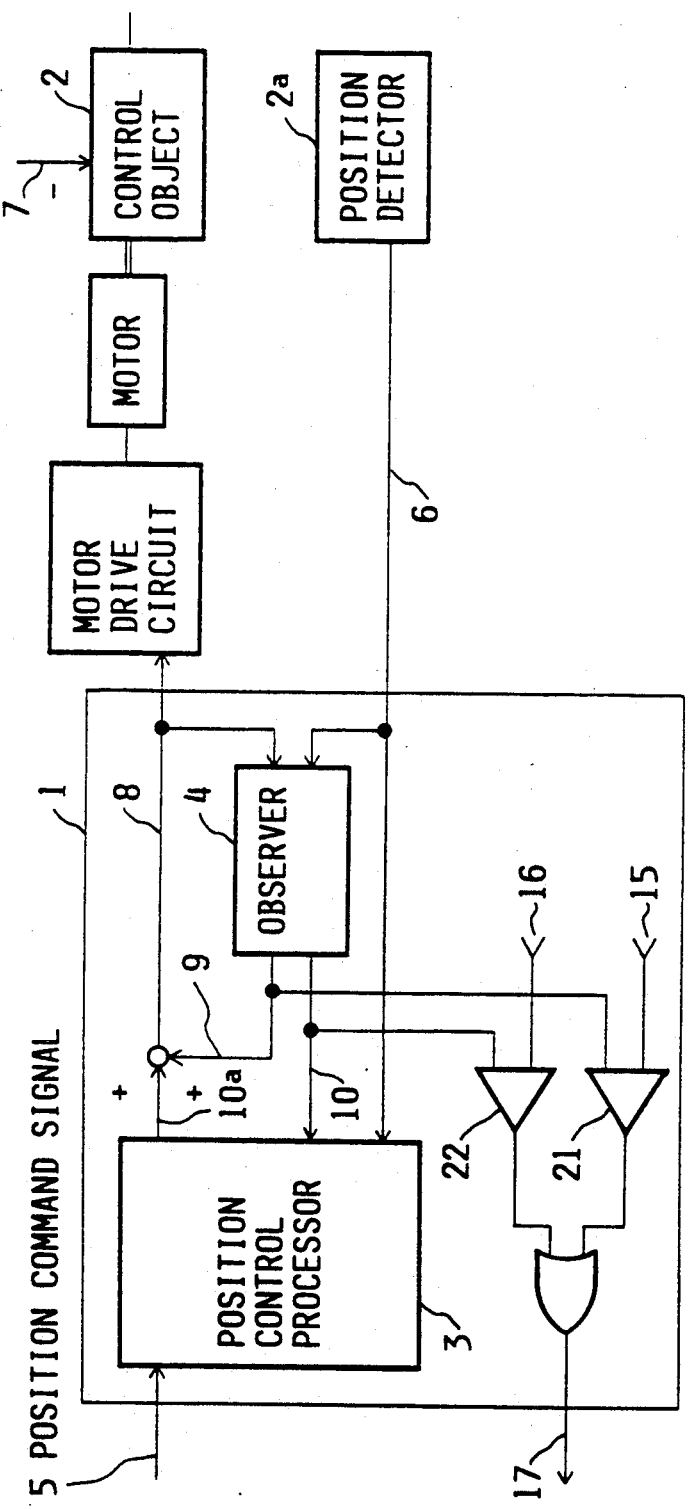
FIG. 9 is a block diagram showing a third embodiment of the invention, incorporated with an abnormality detection function.

The next description is given for a third embodiment with reference to FIG. 9, in which an abnormality detection function is added by utilizing the observed velocity and disturbance torque. In FIG. 9, a position control processor 3 of a servo control device 1 is inputted with a position command signal 5 and a position detection signal 6 fed from a position detector 2a provided in a control object 2. On the other hand, a disturbance and velocity observer 4 is inputted with the position detection signal 6 and a drive torque signal 8. The observer 4 carries out operation based on these inputted signals to output an observed disturbance torque signal 9 and an observed velocity signal 10. The observed velocity signal 10 is inputted into the position control processor 3, and the observed disturbance torque signal 9 is added to an output from the position control processor 3.

The position control processor 3 compares the position command signal 5 with the position detection signal 6 and operates to calculate with using the compared results and the observed velocity a drive force needed for moving the object to a commanded position outputs a drive torque command signal 10a. This drive torque command signal 10a is added with the observed disturbance torque signal 9 to produce the drive torque signal 8. The control object 2 is controllably driven according to the net drive torque which cancels out a disturbance load generated in the object.

Moreover, the observed disturbance torque signal 9 from the observer 4 is inputted into a comparator 21 to compare with a given disturbance load limit 15, while the observed velocity signal 10 is inputted into another comparator 22 to compare with a given velocity limit 16. When either of the observed signals exceeds the corresponding limit value, an OR gate circuit outputs an abnormality detection signal 17 to detect abnormality occurring in the system. Then, protective action will be undertaken in response to the abnormality detection signal to turn off a power source, to sound an alarm or to stop movement of the control object.

Figure 10:
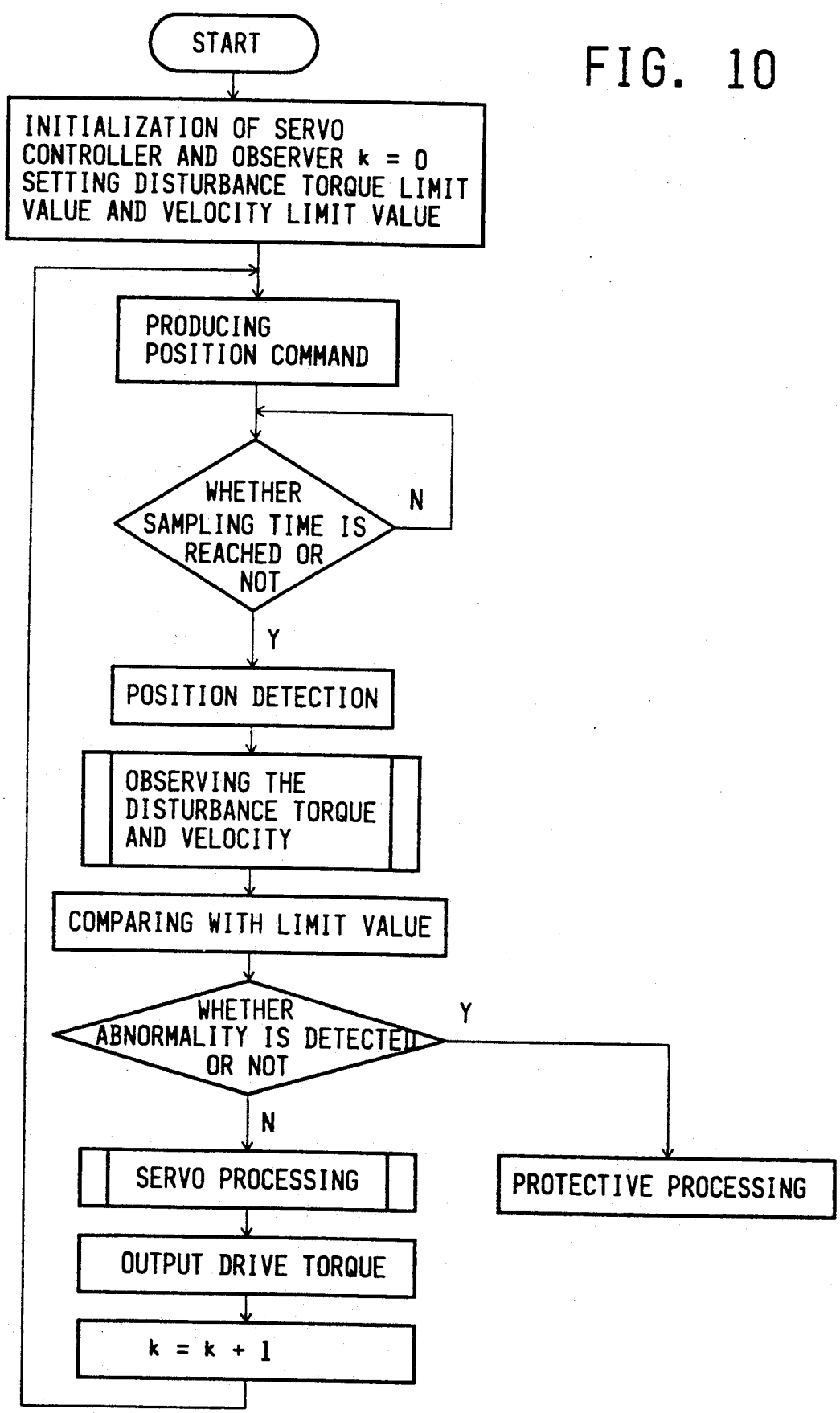
FIG. 10 is a flow chart showing an operation sequence of the FIG. 7 embodiment.

FIG. 10 is a flow chart showing the operation of the FIG. 9 embodiment. The servo control device initializes various data, and then proceeds to a repetitive loop to produce sequentially position command data, and thereafter carries out a position detection after the lapse of each sampling time. The observer estimates a disturbance torque and a velocity based on position detection data and a previous drive torque data. Then, the estimated disturbance torque and velocity are compared with the respective limit value. When abnormality is not detected after the comparison, the estimated values are transferred to the servo process routine. The servo control device outputs a drive torque according to the servo processing results and updates a repetition cycle number K.

According to the invention, the estimated disturbance torque and the estimated velocity do not contain noise components, hence these estimated values are effectively utilized for the abnormality detection to thereby achieve high reliability and to ensure the safe operation.

I claim:

1. A servo control apparatus for controlling according to a position command signal an object in a mechanical drive system having a position detector and for driving the object by a drive torque signal, comprising:
    state observation means receptive of a drive torque signal, and receptive of a position detection signal from the position detector for processing these signals to estimate concurrently a disturbance torque signal and an estimated velocity signal; and
    position control means receptive of the position command signal, the position detection signal, the estimated disturbance signal and the estimated velocity signal for processing these signals to carry out positive feedback of the estimated disturbance torque signal and velocity feedback compensation by the estimated velocity signal to thereby produce the drive torque signal effective to control the object and to cancel out an actual disturbance torque generated in the object.

2. A servo control apparatus according to claim 1; wherein the position control means includes means for producing a drive torque command signal according to the difference between the position command signal and the position detection signal and compensated by the estimated velocity signal through the velocity feedback, and means for adding the estimated disturbance torque signal to the drive torque command signal to effect the positive feedback to produce the drive torque signal.

3. A servo control apparatus according to claim 1; including abnormality means for comparing the estimated disturbance torque signal and the estimated velocity signal with respective limit values to effect detection of abnormality.

4. A servo control apparatus according to claim 3; wherein the abnormality means includes means operative when either of the estimated signals exceeds the corresponding limit value to output an abnormality detection signal.

5. A servo control apparatus for controlling according to a position command signal an object in a mechanical drive system having a position detector and for driving the object by a drive torque signal, comprising:
    observation processing means for processing a drive torque signal and a position detection signal from the position detector to generate a disturbance torque signal and a velocity signal; and
    control processing means for receiving and processing the position command signal, the position detection signal, the disturbance torque signal and the velocity signal to carry out positive feedback of the disturbance torque signal and to generate the drive torque signal effective to cancel out an actual disturbance torque generated in the object.

6. A servo control apparatus according to claim 5; wherein the control processing means includes means for carrying out velocity feedback compensation dependent on the velocity signal and generating the drive torque signal dependent on the velocity feedback compensation.

7. A servo control apparatus according to claim 5; wherein the control processing means includes means for comparing the position command signal and the position detection signal to calculate a drive force value, and means for generating a drive torque command signal dependent on the drive force value and the velocity signal, whereby the drive torque signal is dependent on the sum of the disturbance torque signal and the drive torque command signal.

8. A servo control apparatus according to claim 5; further including comparing means for comparing the disturbance torque signal and the velocity signal with respective predetermined limit values to effect detection of an abnormal condition.

9. A servo control apparatus according to claim 8; wherein the comparing means includes means for outputting an abnormality detection signal when either the disturbance torque signal or the velocity signal exceeds its corresponding predetermined limit value.

* * * * *